United States Patent [19]

Akiba

[11] Patent Number: 4,860,983
[45] Date of Patent: Aug. 29, 1989

[54] ATTACHMENT BRACKET FOR A LIQUID LEAKAGE SENSOR USED IN DRAIN OPENINGS

[75] Inventor: Jyuji Akiba, Saitama, Japan

[73] Assignee: Junkosha Co., Ltd., Japan

[21] Appl. No.: 257,318

[22] Filed: Oct. 13, 1988

[30] Foreign Application Priority Data

Oct. 16, 1987 [JP] Japan .............................. 62-157546[U]

[51] Int. Cl.⁴ ............................................. G01M 3/04
[52] U.S. Cl. ...................................... 248/205.1; 73/40
[58] Field of Search ...................... 248/205.1; 404/2-5; 376/250; 73/40, 40.5 R, 49.8, 49.2 T; 340/605

[56] References Cited

U.S. PATENT DOCUMENTS

| | | | |
|---|---|---|---|
| 601,794 | 4/1898 | Hershberger | 404/4 X |
| 2,924,352 | 2/1960 | Santner et al. | 73/40.5 R X |
| 3,564,527 | 2/1971 | Lerner et al. | 73/40.5 R X |
| 4,650,365 | 3/1987 | Runnels | 404/4 X |
| 4,682,492 | 7/1987 | Green | 73/40.5 R X |

Primary Examiner—Alvin C. Chin-Shue
Attorney, Agent, or Firm—Mortenson & Uebler

[57] ABSTRACT

An attachment bracket for attaching a liquid leakage sensor to a drain opening is provided. The attachment bracket has a funnel-shaped bracket body whose outer circumference is fitted in a liquid-tight relation inside the upper portion of the drain opening, this upper, tapered funnel portion being inclined downwardly toward a central opening leading to the drain. A generally circularly-cylindrical, "C"-shaped wall member of a prescribed height is installed on the upper funnel surface of the bracket body and extends around the circumference of the central opening of the bracket body except in the region of the opening of the "C" of the wall member, and a leak detecting sensor is attached to the bracket body within the opening of the "C" of the wall member. In use, a leak that enters the drain is blocked by the wall member and channelled by the wall member around to the opening of the "C", thereby concentrating the leak to the region of the sensor location more rapidly than would otherwise occur. In a preferred embodiment, a cap member is positioned over the open top of the "C"-shaped wall member to further channel and concentrate a leak toward the opening of the "C" in the wall member.

2 Claims, 1 Drawing Sheet

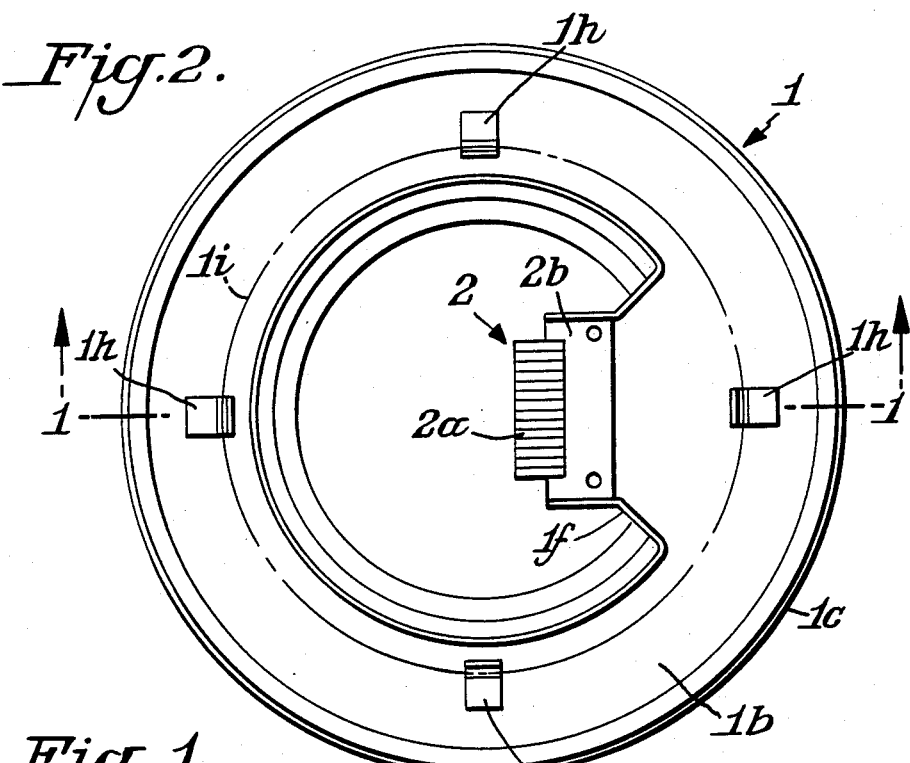
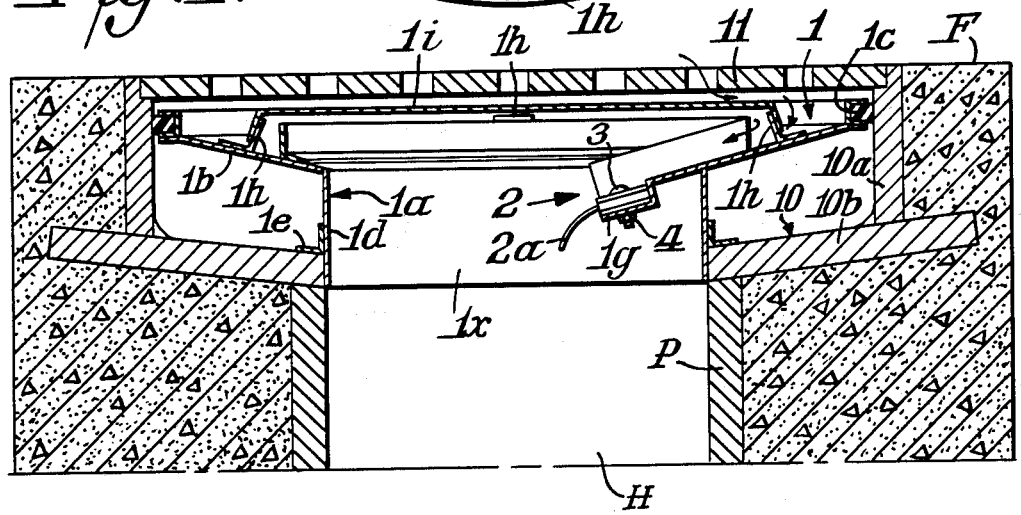
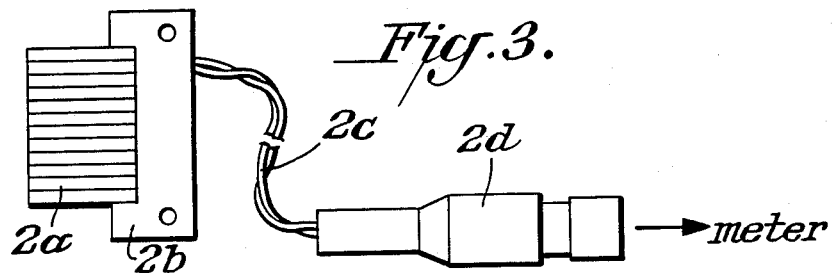

ATTACHMENT BRACKET FOR A LIQUID LEAKAGE SENSOR USED IN DRAIN OPENINGS

BACKGROUND OF THE INVENTION

The present invention relates to an attachment bracket for a liquid leakage sensor used in drain openings.

In nuclear power generating stations, thermal power generating stations, and chemical plants, the earliest possible detection of leaking liquids such as water flowing into drain openings is necessary.

One possible method of meeting such demands is to install a liquid leakage sensor on the peripheral wall of the drain opening involved. In the past, however, there has been no adequate means for installing such liquid leakage sensors inside drain openings in a reliable and effective manner. Accordingly, there has been a demand for the development of such a means. The object of the present invention is to meet this demand.

SUMMARY OF THE INVENTION

An attachment bracket for attaching a liquid leakage sensor to a drain opening is provided comprising a funnel-shaped bracket body whose outer circumference is fitted in a liquid-tight relation inside the upper portion of the drain opening, this upper, tapered funnel portion being inclined downwardly toward a central discharge opening leading to the drain. A generally circularly-cylindrical, "C"-shaped wall member of a prescribed height is installed on the upper funnel surface of the bracket body and extends around the circumference of the central opening of the bracket body except in the region of the opening of the "C" of the wall member. A leak detecting sensor is attached to the bracket body within the opening of the "C" of the wall member. In use, a leak that enters the drain is blocked by the wall member and channelled by the wall member around to the opening of the "C", thereby concentrating the leak to the region of the sensor location more rapidly than would otherwise occur. The attachment bracket preferably has a cap member positioned over the open top of the "C"-shaped wall member to further channel and concentrate a leak toward the opening of the "C" in the wall member.

BRIEF DESCRIPTION OF THE DRAWINGS

FIG. 1 is a cross-sectional view of the bracket and sensor of the present invention, taken substantially along line 1—1 of FIG. 2, installed in a drain opening.

FIG. 2 is a top plan view of the bracket and sensor according to the invention.

FIG. 3 is a schematic view of the leak detecting sensor of the invention.

DETAILED DESCRIPTION OF THE INVENTION AND PREFERRED EMBODIMENTS WITH REFERENCE TO THE DRAWINGS

An attachment bracket for attaching a liquid leakage sensor to a drain opening is provided. The attachment bracket has a funnel-shaped bracket body whose outer circumference is fitted in a liquid-tight relation inside the upper portion of the drain opening, this upper, tapered funnel portion being inclined downwardly toward a central opening leading to the drain. A generally circularly-cylindrical, "C"-shaped wall member of a prescribed height is installed on the upper funnel surface of the bracket body and extends around the circumference of the central opening of the bracket body except in the region of the opening of the "C" of the wall member, and a leak detecting sensor is attached to the bracket body within the opening of the "C" of the wall member. In use, a leak that enters the drain is blocked by the wall member and channelled by the wall member around to the opening of the "C", thereby concentrating the leak to the region of the sensor location more rapidly than would otherwise occur. In a preferred embodiment, a cap member is positioned over the open top of the "C"-shaped wall member to further channel and concentrate a leak toward the opening of the "C" in the wall member.

More specifically, the present invention is an attachment bracket for a liquid leakage sensor used in drain openings which is an attachment bracket that is used to attach a liquid leakage sensor to the upper portion of a drain opening, and which is characterized by the fact that the attachment bracket comprises a funnel-shaped bracket body whose circumference is fitted in a liquid-tight relation inside the drain opening, and whose upper surface is inclined downwardly toward a central opening. A "C"-shaped wall member of a prescribed height is installed on the upper surface of the bracket body and this wall member surrounds the aforementioned central opening of the bracket body except in the opening of the "C". A sensor attachment part is formed on the bracket body which attaches the liquid leakage sensor in the opening of the "C", i.e., in the area around the central opening that is not surrounded by the aforementioned wall member.

The attachment bracket for a liquid leakage sensor used in drain openings according to the present invention collects a leaking liquid in at least one place by means of the aforementioned bracket body which is installed inside the drain opening. The collected leaking liquid is then channelled toward and detected by the aforementioned liquid leakage sensor. Thus, early detection of liquid leakage is made possible.

One example of application of the present invention will be described with reference to the attached figures.

In FIG. 1, H indicates a drain opening. This drain opening H is installed in a floor surface F, and is designed so that it drains any liquid which has leaked onto the floor surface F from the floor surface F into a drain pipe P. A drain fixture 10, preferably made of stainless steel, for the purpose of conducting leaking liquid from the floor surface F into the drain pipe P, which has a prescribed diameter, is embedded in the drain opening H. This drain fixture 10 consists of an upper cylindrical part 10a and a funnel-shaped part 10b which slopes inwardly. A cover 11 is fit into the upper portion of the cylindrical part 10a. A multiple number of holes which allow the passage of leaking liquid are formed in this cover 11.

The attachment bracket 1 for a liquid leakage sensor used in drain openings in this example of application of the present invention is designed so that it is attached inside the upper portion of the drain opening H, i.e., to the upper rim of the cylindrical part 10a of the drain fixture 10.

The main body of the attachment bracket 1 is a funnel-shaped bracket body 1a. This bracket body 1a has an upper ring-shaped inclined plate 1b whose upper surface slopes downwardly toward a central opening 1x. A ring-shaped rubber gasket 1c fits against the interior circumference of the cylindrical part 10a in a liquid-tight relation and is attached to the outer circumference of the inclined plate 1b. A cylindrical lower part 1d, which fits against the interior circumference of the funnel-shaped part 10b in a liquid-tight relation, extends from the bottom edge of the inclined plate 10b. The rim of the central opening 1x 1 is formed by this cylindrical member 1d. A ring member 1e, which is "V"-shaped in cross-section and which supports the bracket body 1a on the upper surface of the funnel-shaped part 10b, is attached around the outer circumference of the cylindrical member 1d.

A wall member 1f of a prescribed height is installed around the circumference of the central opening 1x on the upper surface of the inclined plate 1b. In this example of application, this wall part 1f is generally "C"-shaped when viewed in a plan view as in FIG. 2, and is arranged so that it surrounds the aforementioned central opening 1x in the inclined plate 1b except in one place, located on the right side of FIG. 2, i.e., the opening of the "C". It would also be possible to provide two or more places where the aforementioned opening 1x is not surrounded by the aforementioned wall part 1f, these places forming liquid outflow areas. The portion of the rim of the central opening 1x in the inclined plate 1b that is not surrounded by the wall member 1f is extended slightly toward the center of the opening 1x, i.e., to the left in FIG. 2, and the wall member 1f is extended along both sides of this extended portion. As shown in FIG. 1, a step is formed in the extended portion of the inclined plate 1b, and the lower portion of this step acts as an attachment part 1g for a liquid leakage sensor 2, described below. The top surface of this attachment part 1g slopes downwardly, and is designed so that a liquid leakage sensor 2 can be attached to its upper surface by means of bolts 3 and nuts 4. Accordingly, the liquid leakage sensor 2 is attached so that it slopes downwardly toward the inside.

As shown in FIG. 3, the liquid leakage sensor 2 is formed of a sensing element 2a attached to a glass epoxy substrate 2b, and this sensing element 2a is connected to an external, conventional liquid leakage monitoring device (not shown) through lead wires 2c and connector 2d. The sensing element 2a detects a leaking liquid by utilizing the conductivity of the leaking liquid as it runs down across the upper surface of the sensing element 2a. When the sensor 2 is attached to the bracket 1g as shown in FIG. 1, the sensing element 2a bends downwardly as shown in FIG. 1, so that the leaking liquid runs off of the sensing element 2a. When the liquid leakage sensor 2 is attached as shown, the upper surface of the liquid leakage sensor 2 is positioned a step below the inclined surface of the inclined plate 1b.

Four "L"-shaped bracket fixtures 1h are preferably installed on the upper surface of the inclined plate 1b. These fixtures 1h are positioned at equal intervals around the circumferences of the inclined plate 1b. A cap 1i is supported by these fixtures 1h. This cap 1i has the shape of an inverted saucer. When this cap 1i is attached, the outer rim of the cap 1i is positioned slightly above the upper surface of the inclined plate 1b, and the lower surface of the cap 1i is positioned slightly above the top of the wall part 1f. In the top plan view of FIG. 2, the cap 1i is shown in phantom for clarity of expression. This cap 1i forces liquid entering interior openings in grate 11 to flow toward the opening in wall member 1f and to the sensor 2.

The attachment bracket 1, with the liquid leakage sensor 2 attached, is installed as shown in FIG. 1. Specifically, the upper rubber gasket 1c is fit in a liquid-tight relation against the interior circumference of the cylindrical part 10a, and the lower cylindrical part 1d is fitted against the interior circumference of the funnel-shaped part 10b. In this manner, the attachment bracket 1 is pushed into the interior of the drain opening H from above. When the ring member 1e meets the upper surface of the funnel-shaped drain member 10b, the bracket 1 is in place.

With cap member 1i in place, any conductive liquid which flows out across the floor surface F will drop into the drain opening H through the openings in the cover 11, and will be received by the upper surface of the inclined plate 1b. The leaking liquid received by the upper surface of the inclined plate 1b flows downwardly along the inclined surface of the inclined plate 1b, and is dammed by the aforementioned wall member 1f. This liquid will enter the drain pipe P only by passing through the one place that is not surrounded by the wall member 1f. Accordingly, all of the leaking liquid is channelled to one place, and flows across the surface of the sensing element 2a of the liquid leakage sensor 2. As a result, the liquid leakage sensor 2 reliably detects the leaking liquid at substantially the time that leakage begins.

The cap member 1i prevents the leaking liquid from entering the drain pipe P directly, and thus conducts all of the leaking liquid across the surface of the inclined plate 1b. When the amount of leaking liquid is large, the leaking liquid flows over the top of the wall part 1f, and drains away by passing between the wall part 1f and the cap 1i. Accordingly, there is little danger that the drain opening H will overflow.

In order to remove the attachment bracket 1, it is necessary merely to pull the attachment bracket 1 upward.

As described above, the attachment bracket for a liquid leakage sensor used in drain openings according to the present invention is designed to have a bracket body installed inside the drain opening, and leaking liquid is collected in at least one place by a wall member which is attached to this bracket body. Liquid draining from this place of collection is then detected by a liquid leakage sensor affixed to the bracket within the opening. Accordingly, leaking liquid can be collected and reliably detected from very nearly the time that leakage occurs.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. An attachment bracket for attaching a liquid leakage sensor to a drain opening comprising:
   (a) a funnel-shaped bracket body whose outer circumference is fitted in a liquid-tight relation inside the upper portion of said drain opening, the upper, tapered funnel portion being inclined downwardly toward a central discharge opening leading to said drain;
   (b) a generally circularly-cylindrical, "C"-shaped wall member of a prescribed height installed on an upper funnel surface of said bracket body which extends around a circumference of said central opening of said bracket body except in the region of the opening of the "C" of said wall member; and (c) a leak detecting sensor attached to said bracket body within the opening of the "C" of said wall member, whereby, in use, a leak that enters said drain is blocked by the wall member and channelled by the wall member around to the opening of the "C", thereby concentrating the leak to the region of the sensor location more rapidly than would otherwise occur.

2. The attachment bracket of claim 1 wherein a cap member is positioned over the open top of said "C"-shaped wall member to further channel and concentrate a leak toward the opening of the "C" in said wall member.

* * * * *